United States Patent [19]

Etra

[11] Patent Number: 5,012,334

[45] Date of Patent: Apr. 30, 1991

[54] VIDEO IMAGE BANK FOR STORING AND RETRIEVING VIDEO IMAGE SEQUENCES

[75] Inventor: William Etra, Fort Lee, N.J.

[73] Assignee: Dubner Computer Systems, Inc., Paramus, N.J.

[21] Appl. No.: 471,335

[22] Filed: Jan. 29, 1990

[51] Int. Cl.⁵ .............................................. H04N 7/18
[52] U.S. Cl. .................................... 358/102; 358/311; 358/903; 360/14.1
[58] Field of Search ............... 358/102, 185, 311, 903, 358/342; 360/14.1

[56] References Cited

U.S. PATENT DOCUMENTS

| | | | |
|---|---|---|---|
| 4,635,136 | 1/1987 | Ciampa et al. | 358/102 X |
| 4,660,101 | 4/1987 | Martin | 358/342 |
| 4,675,755 | 6/1987 | Baumeister et al. | 358/102 X |
| 4,727,971 | 1/1988 | Sawyer | 360/14.1 X |
| 4,873,585 | 10/1989 | Blanton et al. | 358/342 X |
| 4,949,187 | 8/1990 | Cohen | 358/102 X |

*Primary Examiner*—Victor R. Kostak
*Attorney, Agent, or Firm*—Francis I. Gray; John Smith-Hill

[57] ABSTRACT

A video image bank system for preparing an edit tape and associated edit list from a library of stock video image sequences uses a set of video disks with an associated library index. A microprocessor or personal computer is loaded with the library index, and an operator selects an initial set of image sequences from a menu or by using key words, specifically or highlighted in a word processor text file, for a desired effect. Groups of still frames, one from each identified image sequence, are displayed and the operator selects any one of the represented image sequences for addition to the edit tape and the associated edit list. Once all the desired stock video image sequences have been selected from the library and transferred to the edit tape and associated edit list, these sequences may readily be added to a production video sequence using normal editing procedures.

12 Claims, 4 Drawing Sheets

VIDEO IMAGE BANK FOR STORING AND RETRIEVING VIDEO IMAGE SEQUENCES

BACKGROUND OF THE INVENTION

The present invention relates to video production, and more particularly to a video image bank that provides thousands of stock footage image sequences for immediate use by the producer of a video tape in preparing a story board and/or edit tape.

Television is a commonplace part of people's lives, and unless the video viewed is exciting people become bored. They expect all video to be up to the quality of normal broadcast programming. The cost of producing broadcast quality programming for a small producer, such as for industrial and training tapes, is quite high. Even attempts to highlight industrial productions by interjecting exciting stock footage are insufficient because the time and cost involved limits the use. Further the cost of just maintaining a library of such stock footage is in itself quite expensive for a small producer, as it requires many different reels of video tape to be maintained. These tapes are difficult and time consuming to use since, even if indexed, the tapes have to be searched for the desired footage before that footage can be edited into a production tape. As the video market continues to grow the need for inexpensive means of production continues to expand. The standard way of cutting production costs has been the use of stock footage, but the cost and time involved in locating and acquiring stock footage is a major problem for the small producer.

A related problem for the small producer, especially in the industrial production area, is that the producer is used to writing out copy, but is unfamiliar or uncomfortable with video concepts. Therefore such productions based upon such written copy tend to be stilted with all the drawbacks of non-broadcast quality video.

Therefore, what is desired is an apparatus for storing stock video footage in a compact, random access manner so that any footage desired may be retrieved virtually instantaneously to reduce the expense of storing the footage and the expense of producing video tapes that are interjected with such stock footages, including the ability to use written copy as an index into the stored stock video footage.

SUMMARY OF THE INVENTION

Accordingly the present invention provides a video image bank in the form of a visual effects library for video production that puts thousands of exciting stock image sequences at the fingertips of a video producer. The library is stored on video disk and indexed on computer disks, and includes appropriate audio sound effects to provide a complete system. The computer index is cross referenced to allow the user to find appropriate audio and video sequences by key word search of a written production script. The system accepts standard text formats so that scripts can be run through, and is compatible with personal computers so that lower priced versions take advantage of equipment already owned by the user. The library may reside in an automated disk changer to reduce access time. The hardware includes a set of video disks with optional changing mechanisms, a microprocessor controller and a disk player as well as a computer display. The software for the controller includes a program to index the visual information of the disks, the program being menu driven and allowing for the cross referencing of image sequences under a number of headings, and also allows for a number of still frames from the image sequences to be displayed. The program may access highlighted words from the written production script for use as key words to access the index and identify potential image sequences.

The objects, advantages and novel features of the present invention are apparent from the following detailed description when read in conjunction with the appended claims and attached drawing.

DESCRIPTION OF THE PREFERRED EMBODIMENT

Figure 1:
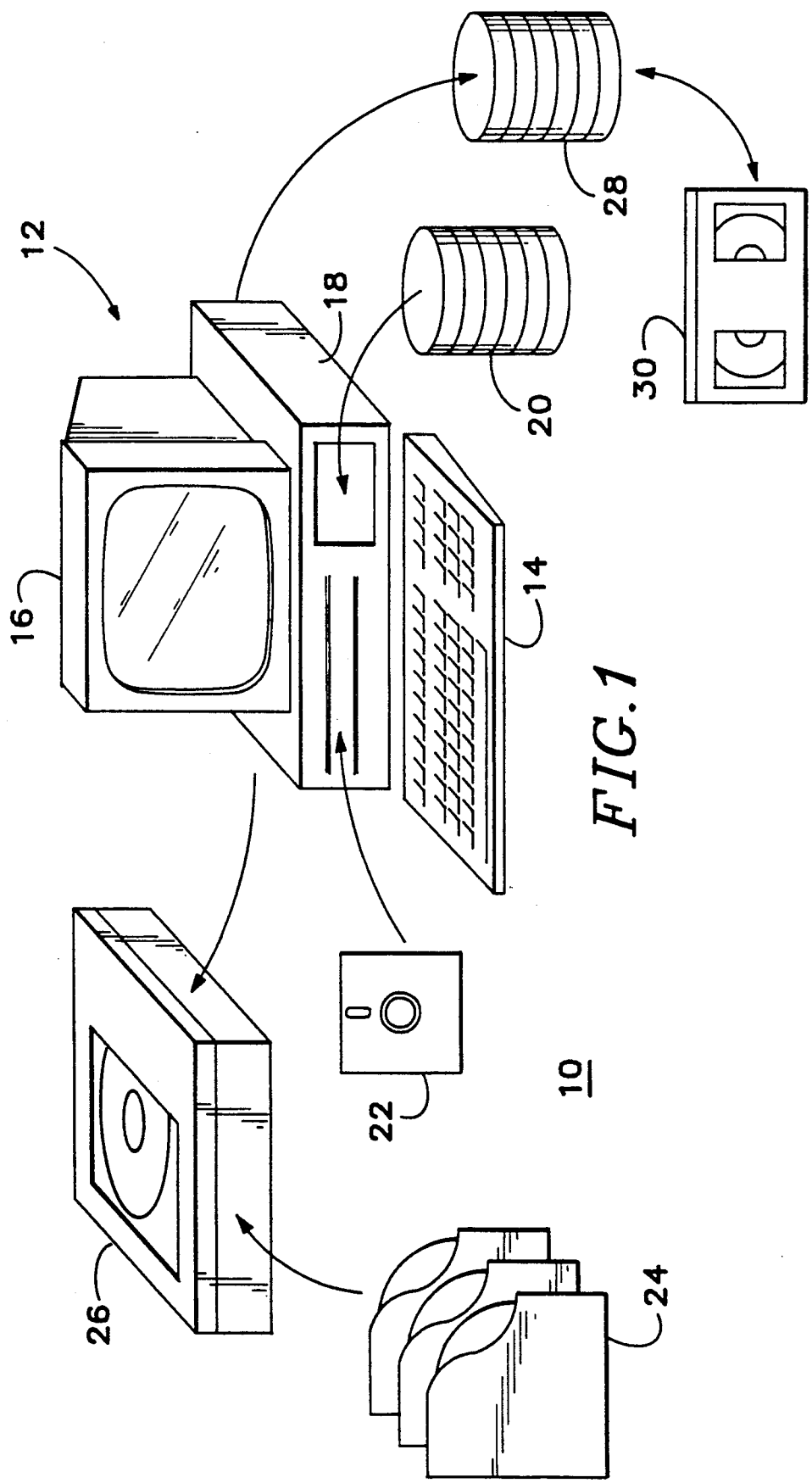
FIG. 1 is a block diagram of a first embodiment for a video image bank system according to the present invention.

Referring now to FIG. 1 a video image bank system 10 is shown based upon a personal computer 12 having a keyboard 14, a display device 16 and a microprocessor 18. The microprocessor 18 includes a hard disk drive 20 as well as floppy disk drives 22. A library 24 of video disks stores many motion picture image sequences by means of video technology. A video library index is loaded via the floppy disk drives 22 onto the hard disk drive 20. The supporting software also is loaded onto the hard disk drive. Using the keyboard and appropriate menus displayed on the display device 16 a particular video disk and track(s) are identified that have video image sequences corresponding to a desired selected menu item or highlighted key word in a word processor text file. The appropriate video disk from the library 24 is manually loaded into a video disk player 26 and a still frame from each appropriate track of the disk is displayed automatically on the display device 16 under control of the microprocessor 18. From the still frames one image sequence is selected by the user for viewing and, if acceptable, for storing as part of an edit list 28 or part of the word processor text file to create a story board, and/or the image sequence is recorded on a video cassette 30.

A producer with no familiarity with television productions may write a script, highlighting key words where stock footage material is desired. The program in the microprocessor uses the key words as indices to the library index, and identifies various stock footages that exemplify the highlighted key words. The producer then may display from the identified library disks a still frame for each of the identified stock footages on that disk. For example if the key word is "crash", then the program identifies all stock footages that involve crashes—airplane, car, train, boat, etc. Stills from each identified stock footage that is on a particular disk mounted for play back are displayed and the producer selects which one(s) are desired for further review. The selected footages may be played back in full from the disk so the producer can see whether that particular footage is appropriate. When the producer finally selects a particular stock footage for that key word, then the identification of the stock footage is inserted into the written script, or word processor text file, to form a story board. Further the program acts heuristically by associating the key word and the selected footage with each other and with the producer so that when the producer again highlights as a key word "crash", the program first calls up what the producer previously selected for that key word together with closely related alternatives. Thus if the producer selected a particular car crash, the next time the producer uses that key word, that previously selected car crash footage and other car crash footages will be selected for display by the program, ignoring boat, airplane and train crashes.

Figure 2:
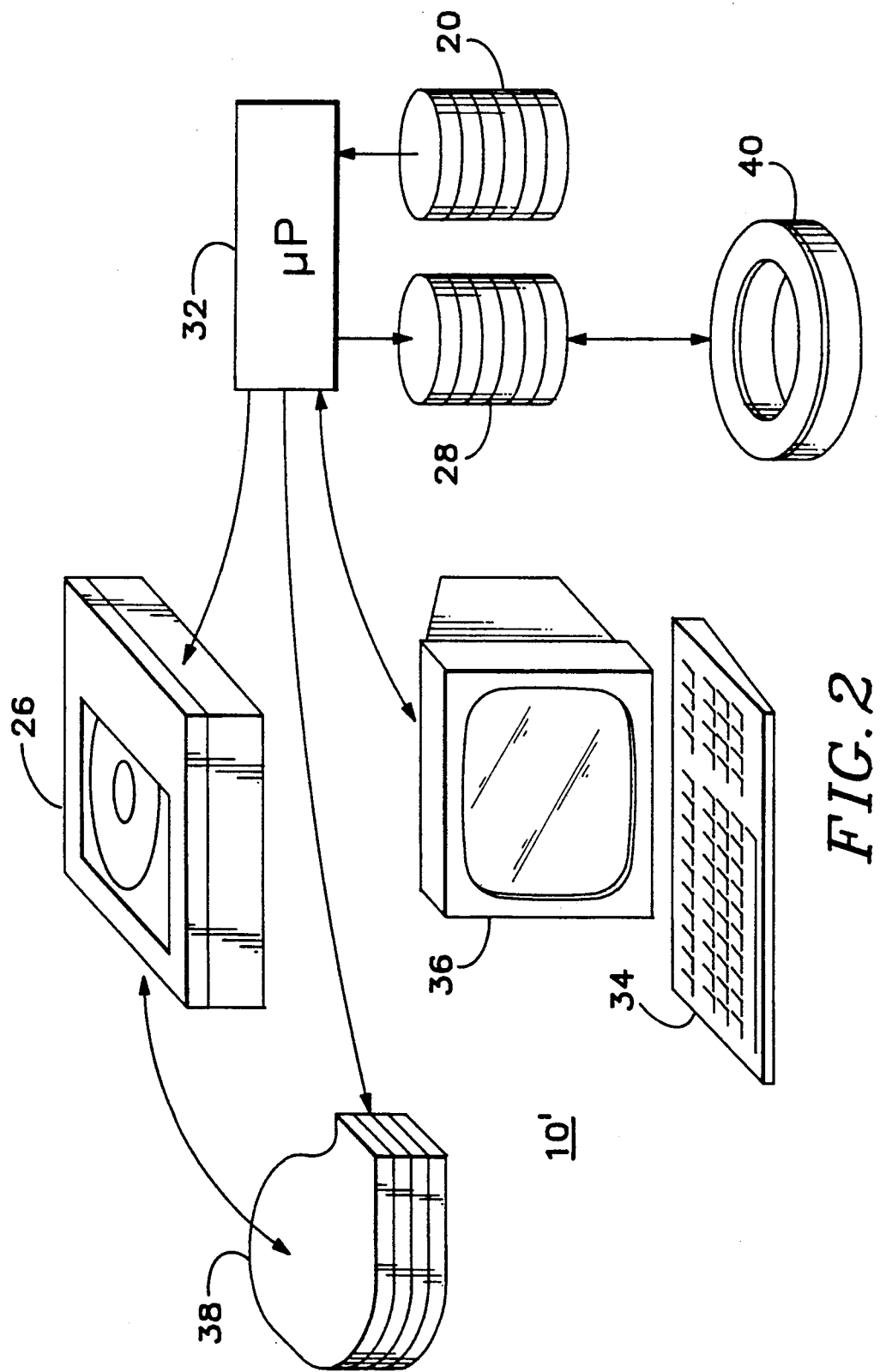
FIG. 2 is a block diagram of a second embodiment for a video image bank system according to the present invention.

FIG. 2 shows a more expensive version of the video image bank 10' that uses a dedicated microprocessor 32 together with an appropriate keyboard 34 and monitor 36. The microprocessor 32 controls the disk player 26 as well as a video disk changer 38 that contains a limited version of the video disk library. Again as in the personal computer version, the software operates in the same manner, using the loaded video index 20 to identify the particular disk(s) and track(s) that contain desired motion picture image sequences selected from a menu or highlighted key words displayed on the monitor 36. A still frame from each selected image sequence (up to, for example, eight) automatically is displayed on the monitor 36, and the operator selects any still frame. The selected footage is run from the disk player 26 and, if the image sequence is acceptable, then it is added to the edit list 28 or inserted into a story board, and the sequence may be stored on a broadcast quality tape 40.

Figure 3:
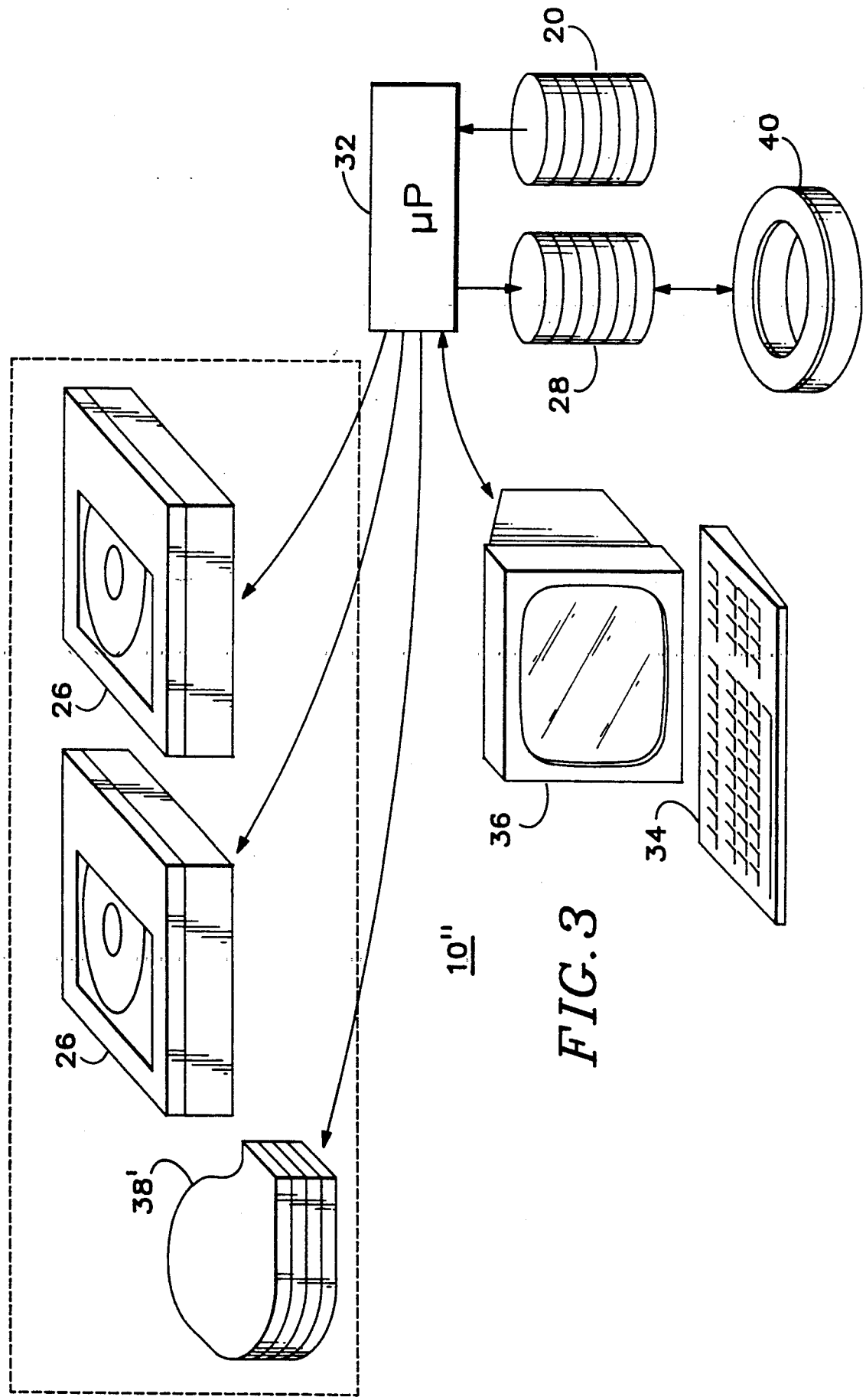
FIG. 3 is a block diagram of a third embodiment for a video image bank system according to the present invention.

The final version of the video image bank system 10", shown in FIG. 3, uses a changer 38' that has an increased disk storage capability together with two video disk players 26 to decrease access speed to the motion picture image sequences. Such a video changer that includes the video disk players is the VIDEOBOX digital video music system by Videobox Networks Inc. of New York City, N.Y. that permits storage and retrieval of thirty two-sided laser disks. Again the software operation is the same as for the other versions.

The edit lists 28 or story boards and video tapes 30, 40 generated by this system are then used with a regular edit system to generate the desired final video product. The microprocessor/personal computer 32, 12 may also be used to add scripts or compatible text editing to the image sequences. Searching may also be done on key words contained in the data index 20, which key words may be expanded by the user. In this manner a user may search and easily extract from a video library image sequences that are desired for use in a final video product, and transfer those desired sequences to an edit tape together with an associated edit list. Then these sequences may readily be interjected into the final video product using normal video editing techniques.

Figure 4:
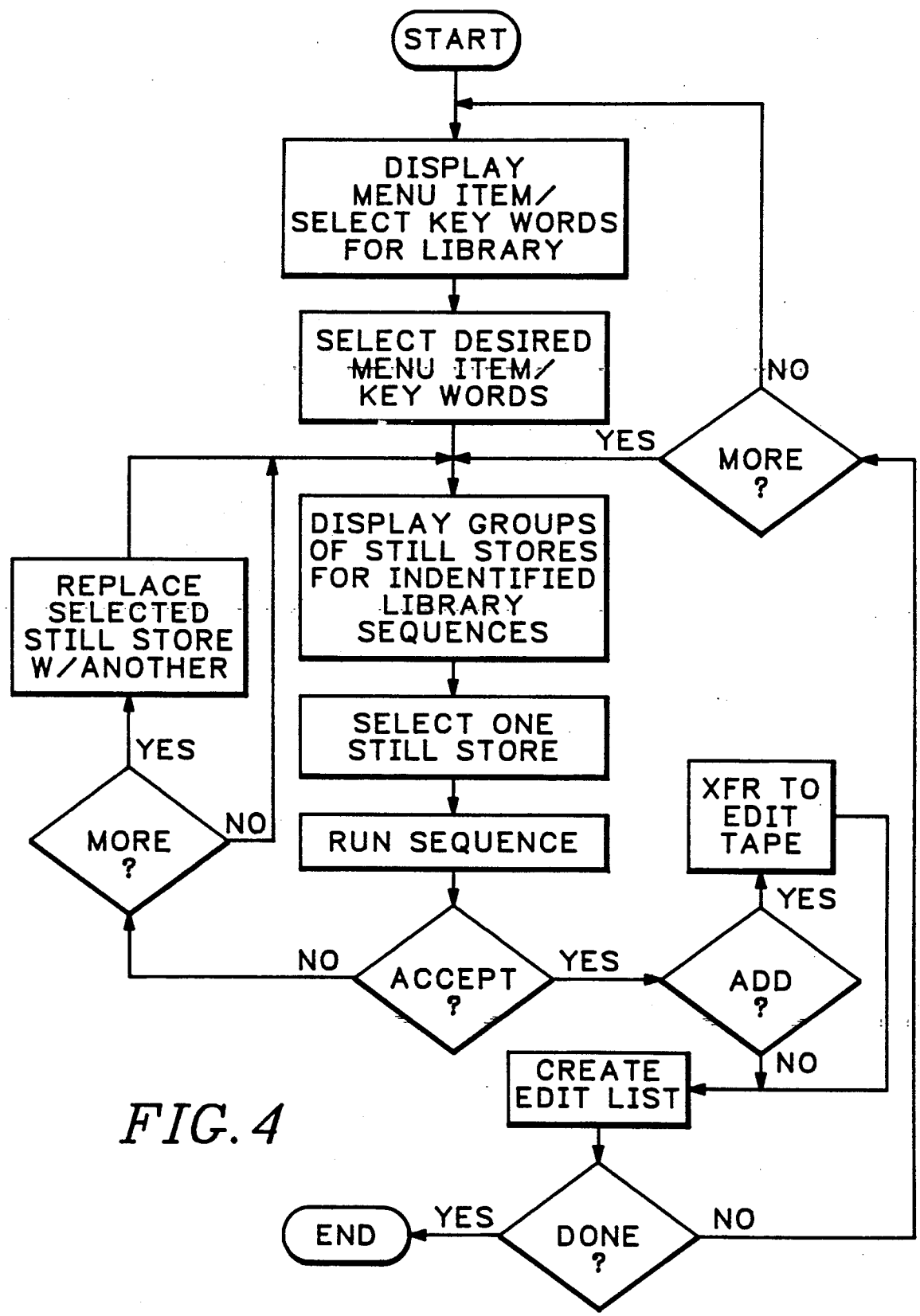
FIG. 4 is a representative flow chart diagram for the controller of a video image bank system according to the present invention.

As shown in FIG. 4 the video image bank system is initialized with the library index for the set of video disks provided to the user, the library index also including a key word index. The operator selects from a menu or via key words a plurality of image sequences as an initial selection. These image sequences basically include material that is in the public domain, such as material from government sources and film libraries, as well as separately purchased specialized material. The image sequences are cross referenced so that, for example, a nuclear explosion may be accessed under explosion, atomic energy and destruction. Once the image sequences are identified, then the appropriate disk(s) is transferred to the disk player 26, either manually or via the automatic changer 36, 36'. A still frame from each identified image sequence is displayed on the monitor in groups of, for example, eight, and the operator may select any one for running to observe whether it is suitable for the particular purpose the operator may have. Once one of the image sequences is accepted, the image sequence is transferred to an output video tape and an edit list for that tape is prepared. For each acceptable image sequence the corresponding video is transferred to the tape and the edit list is updated. After all the desired standard video stock footages are transferred from the library to the output tape, the output tape and associated edit list may be used by a standard editing system to interject the selected image sequences into the appropriate locations in the final video product.

Thus the present invention provides a video image bank system that allows an operator to readily select a desired video image sequence from a library of image sequences and transfer it to an edit tape together with an edit list so that final editing of a video product may be performed quickly and efficiently.

What is claimed is:

1. A video image bank for storing a plurality of video motion picture image sequences and automatically accessing one of the stored image sequences, said video image bank comprising:
   video storage means containing a library of video motion picture image sequences;
   library index means containing an index of the video storage means;
   means for accessing the library index to automatically identify an initial set of image sequences;
   display means for displaying a still frame for each video motion picture image sequence of the initial set; and
   means for selecting one of the image sequences from the initial set.

2. A video image bank as recited in claim 1 wherein the means for accessing comprises:
   a controller having a stored program;
   means for interacting with the controller to provide inputs to the stored program, the stored program accessing the library index according to the provided inputs; and
   means for identifying the initial set of image sequences associated with the accessed library index.

3. A video image bank as recited in claim 2 wherein the display means comprises:
   a video monitor;
   a video playback device;
   means for retrieving from the video playback device the initial set of video motion picture image sequences; and
   means for formatting a still frame for each video motion picture image sequence of the initial set for display on the video monitor.

4. A video image bank as recited in claim 1 further comprising means for storing the selected video image sequence on an output video storage device.

5. A video image bank as recited in claim 1 wherein the video storage means comprises at least one video disk and the display means comprises a video disk playback device.

6. A video image bank as recited in claim 5 wherein the video storage means comprises a plurality of video disks and the display means comprises a video disk changer responsive to the means for accessing to place a video disk on the video playback device.

7. A method of automatically accessing a plurality of video motion picture image sequences stored in a library, said method comprising the steps of:
   accessing a library index for the library of video motion picture image sequences, to automatically identify an initial set of video image sequences;
   displaying a still frame for each video motion picture image sequence of the initial set; and
   selecting one of the video image sequences from the initial set.

8. A method as recited in claim 7, further comprising storing the selected video image sequence on an output video storage device.

9. A method of automatically accessing a plurality of video motion picture image sequences stored in a library, said method comprising the steps of:
   generating a library index;
   accessing the library index to automatically identify an initial set of video image sequences;
   displaying a still frame for each video motion picture image sequence of the initial set; and
   selecting one of the video image sequences from the initial set.

10. A method as recited in claim 9, further comprising storing the selected video image sequence on an output video storage device.

11. A method as recited in claim 9, wherein the step for generating the library index comprises storing at least one key word for each video image sequence and the step of accessing the library index comprises addressing the library index employing a key word.

12. A method as recited in claim 9, wherein the step of generating the library index comprises allocating each video image sequence to at least one menu class and the step of accessing the library index comprises selecting a menu class and identifying the video image sequences in the selected menu class.

* * * * *

REEXAMINATION CERTIFICATE (3193rd)

United States Patent [19]

Etra

[11] B1 5,012,334

[45] Certificate Issued May 13, 1997

[54] VIDEO IMAGE BANK FOR STORING AND RETRIEVING VIDEO IMAGE SEQUENCES

[75] Inventor: William Etra, Fort Lee, N.J.

[73] Assignee: The Grass Valley Group, Inc., Nevada City, Calif.

Reexamination Request:
No. 90/004,009, Oct. 27, 1995

Reexamination Certificate for:
| | |
|---|---|
| Patent No.: | 5,012,334 |
| Issued: | Apr. 30, 1991 |
| Appl. No.: | 471,335 |
| Filed: | Jan. 29, 1990 |

[51] Int. Cl.$^6$ .................................................. H04N 7/18
[52] U.S. Cl. ........................ 348/96; 360/14.1; 386/52
[58] Field of Search ............................ 348/96, 722, 107; 386/4, 52, 55; 360/14.1

[56] References Cited

U.S. PATENT DOCUMENTS

| | | | |
|---|---|---|---|
| 3,098,119 | 7/1963 | Lemelson | 178/6.6 |
| 3,970,775 | 7/1976 | Lemelson | 178/6.8 |
| 4,354,207 | 10/1982 | Chesley | 360/9.1 |
| 4,422,105 | 12/1983 | Rodesch et al. | 358/903 |
| 4,425,586 | 1/1984 | Miller | 358/335 |
| 4,490,810 | 12/1984 | Hon | 364/900 |
| 4,599,611 | 7/1986 | Bowker et al. | 340/721 |

(List continued on next page.)

FOREIGN PATENT DOCUMENTS

| | | |
|---|---|---|
| 0187073 | 7/1986 | European Pat. Off. . |
| 0282997 | 9/1988 | European Pat. Off. . |
| 0309298 | 3/1989 | European Pat. Off. . |
| 2630572 | 10/1989 | France . |
| 2168191 | 6/1986 | United Kingdom . |
| 2208959 | 4/1989 | United Kingdom . |
| 84/02606 | 7/1984 | WIPO . |
| 86/01619 | 3/1986 | WIPO . |
| 86/01631 | 3/1986 | WIPO . |

OTHER PUBLICATIONS

Free, John, "Through the Electronic Looking Glass into Living Pictures", *Popular Science*, Aug. 1981, pp. 68–70.

Sasnett, Rusell Mayo, "Reconfigurabe Video", Feb. 1986.

Cohen, P.S. and Herbst, N.M., "Video Disc Dictionary System", *IBM Technical Disclosure Bulletin*, vol. 25, No. 8, Jan. 1983, p. 4209.

Kennedy, P.J., "Video–Enhanced Computer–Aided Teaching System", *IBM Technical Disclosure Bulletin*, vol. 26, No. 38, Aug. 1983, pp. 1487–1488.

Wong, Andria H., "Database Maintenance for a Video Editing System", May 1986.

Barbour, John D., "The Execution of a Video Editing Controller", May 1986.

Prasad, B.E., Gupta, A., Toong, H.D. and Madnick, S.E., "A Microcomputer–Based Image Database Management System", *IEEE Transactions on Industrial Electronics*, vol. IE–34, No. 1, Feb. 1987, pp. 83–88.

Beauchamp, Donovan Christopher, "A Database Representation of Motion Picture Material", May 1987.

(List continued on next page.)

*Primary Examiner*—Victor R. Kostak

[57] ABSTRACT

A video image bank system for preparing an edit tape and associated edit list from a library of stock video image sequences uses a set of video disks with an associated library index. A microprocessor or personal computer is loaded with the library index, and an operator selects an initial set of image sequences from a menu or by using key words, specifically or highlighted in a word processor text file, for a desired effect. Groups of still frames, one from each identified image sequence, are displayed and the operator selects any one of the represented image sequences for addition to the edit tape and the associated edit list. Once all the desired stock video image sequences have been selected from the library and transferred to the edit tape and associated edit list, these sequences may readily by added to a production video sequence using normal editing procedures.

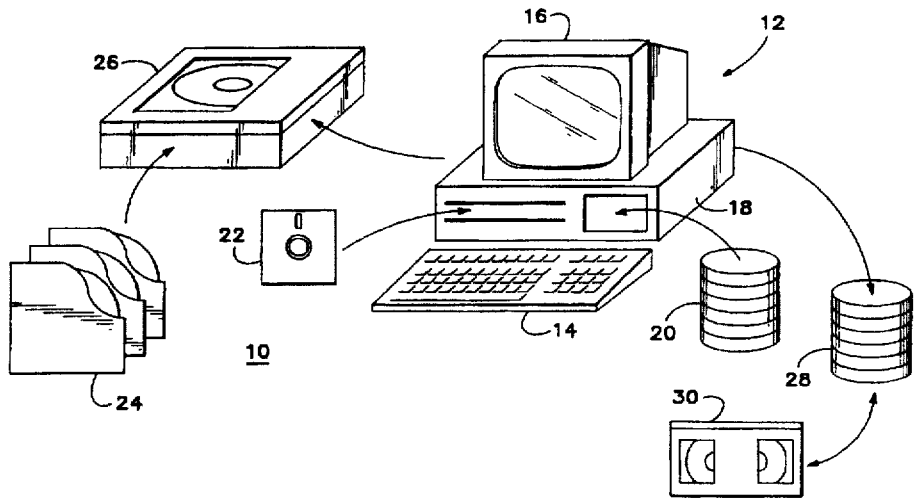

U.S. PATENT DOCUMENTS

| | | | |
|---|---|---|---|
| 4,612,569 | 9/1986 | Ichinose | 358/22 |
| 4,635,136 | 1/1987 | Ciampa et al. | 358/342 |
| 4,641,203 | 2/1987 | Miller | 358/335 |
| 4,652,939 | 3/1987 | Baumeister | 358/342 |
| 4,675,755 | 6/1987 | Baumeister et al. | 360/35.1 |
| 4,685,001 | 8/1987 | Martin | 358/342 |
| 4,685,003 | 8/1987 | Westland | 360/14.1 |
| 4,688,106 | 8/1987 | Keller et al. | 358/342 |
| 4,695,975 | 9/1987 | Bedrij | 364/900 |
| 4,698,664 | 10/1987 | Nichols et al. | 358/10 |
| 4,709,277 | 11/1987 | Ninomiya et al. | 360/14.3 |
| 4,717,971 | 1/1988 | Sawyer | 358/342 |
| 4,766,581 | 8/1988 | Korn et al. | 369/30 |
| 4,774,596 | 9/1988 | Hashimoto | 358/335 |
| 4,873,584 | 10/1989 | Hashimoto | 358/335 |
| 4,890,168 | 12/1989 | Inoue et al. | 358/335 |
| 4,939,689 | 7/1990 | Davis et al. | 364/900 |
| 4,943,866 | 7/1990 | Barker et al. | 358/335 |
| 4,949,187 | 8/1990 | Cohen | 358/335 |
| 5,060,068 | 10/1991 | Lindstrom | 358/185 |
| 5,099,422 | 3/1992 | Foresman et al. | 364/401 |
| 5,115,310 | 5/1992 | Takano et al. | 348/722 |

OTHER PUBLICATIONS

Davenport, Glorianna, "New Orleans in Transition, 1983–1986: The Interactive Delivery of a Cinematic Case Study", remarks given at *The International Congress for Design Planning and Theory*, Aug. 1987.

Hobbs, Richard, "Grafiken und Strandbilder in Fernsehsendungen", *Rundfunktech Mitteilungen*, vol. 32, No. 4, Jul./Aug. 1988, pp. 166–171.

Patent Cooperation Treaty, "Information Storage", *International Classification (5th Edition*, vol. 7, Section G, 1989, pp. 138–145.

Hodges, M.E., Sasnett, R.M., and Ackerman, M.S., "A Construction Set for Multimedia Applications", *IEEE Software*, Jan. 1989, pp. 37–43.

MIT Neuroanatomy Glossary videotape, presented at the 1989 SIGGRAPH conference, held Apr. 30–May 4, 1989.

Wertheim, Steven L., "The Brain Database: A Multimedia Neuroscience Database for Research and Teaching", *Proceedings from The Thirteenth Annual Symposium on Computer Applications in Medical Care*, 1989, pp. 399–404.

Brondmo, H. P. and Davenport, Glorianna, "Creating and Viewing the Elastic Charles—a Hypermedia Journal", presented at *Hypertext2*, Jun. 29, 1989.

Davenport, Glorianna, "The Elastic Charles—A Hypermedia Journal featuring Micons (Moving Icons), Dynamic Links, and Elastic Tools", Summer 1989.

Garfinkel, Simson L., "Picking up the Narrative Thread with MIT's Glorianna Davenport", *New Media Age*, vol. 1, No. 4, Jun. 1991, pp. 15–17.

Videotape "Neuroanatomy", Siggraph copy, copyright MIT Media Labs.

Videotape "Neuroanatomy", Siggraph copy (Windowed Time Code Copy), copyright MIT Media Labs.

REEXAMINATION CERTIFICATE ISSUED UNDER 35 U.S.C. 307

NO AMENDMENTS HAVE BEEN MADE TO THE PATENT

AS A RESULT OF REEXAMINATION IT HAS BEEN DETERMINED THAT:

The patentability of claims 1–12 is confirmed.

* * * * *

REEXAMINATION CERTIFICATE (4008th)
United States Patent [19]
Etra

[11] B1 5,012,334
[45] Certificate Issued  Mar. 7, 2000

[54] VIDEO IMAGE BANK FOR STORING AND RETRIEVING VIDEO IMAGE SEQUENCES

[75] Inventor: William Etra, Fort Lee, N.J.

[73] Assignee: Dubner Computer Systems, Inc., Paramus, N.J.

Reexamination Request:
No. 90/004,832, Nov. 7, 1997

Reexamination Certificate for:
Patent No.: 5,012,334
Issued: Apr. 30, 1991
Appl. No.: 07/471,335
Filed: Jan. 29, 1990

[51] Int. Cl.[7] .................................................... H04N 7/18
[52] U.S. Cl. ........................... 348/96; 386/52; 348/106
[58] Field of Search ........................... 348/96, 722, 714; 386/52, 55; 360/13

[56] References Cited

PUBLICATIONS

The Athena Muse Reference Facility, Mark S. Ackerman, Project Athena, Massachusetts Institute of Technology, Steven L. Wertheim, Department of Brain and Cognitive Sciences, MIT, Matthew E. Hodges, Digital Equipment Corporation, Project Athena, MIT, Russell M. Sasnett, Project Athena, MIT 1988.

*Primary Examiner*—Victor R. Kostak

[57] ABSTRACT

A video image bank system for preparing an edit tape and associated edit list from a library of stock video image sequences uses a set of video disks with an associated library index. A microprocessor or personal computer is loaded with the library index, and an operator selects an initial set of image sequences from a menu or by using key words, specifically or highlighted in a word processor text file, for a desired effect. Groups of still frames, one from each identified image sequence, are displayed and the operator selects any one of the represented image sequences for addition to the edit tape and the associated edit list. Once all the desired stock video image sequences have been selected from the library and transfered to the edit tape and associated edit list, these sequences may readily be added to a production video sequence using normal editing procedures.

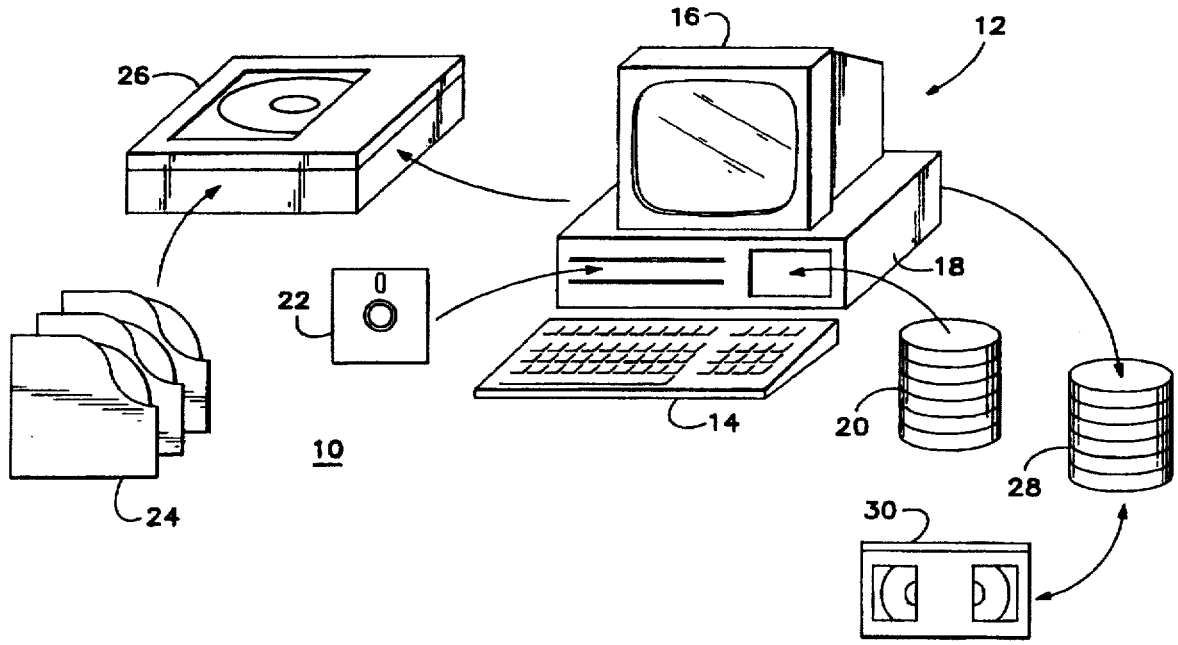

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4 and 6–12 are determined to be patentable as amended.

Claim 5, dependent on an amended claim, is determined to be patentable.

1. A video image bank for storing a plurality of *unrelated* video motion picture image sequences and automatically accessing *a desired* one of the stored *video motion picture* image sequences *that meets a specified search criterion*, said video image bank comprising:
    video storage means containing a library of [a] *the unrelated* video motion picture image sequences;
    library index means containing an index of *search criteria for each of the video motion picture image sequences in* the video storage means;
    means for accessing the library index to automatically identify *from the search criteria* an initial set of *video motion picture* image sequences *from among the unrelated video motion picture image sequences that satisfy the specified search criterion*;
    display means for displaying a still frame for each video motion picture image sequence of the initial set; and
    means for selecting one of the *video motion picture* image sequences from the initial set *as the desired one of the video motion picture image sequences*.

2. A video image bank as recited in claim 1 wherein the means for accessing comprises:
    a controller having a stored program;
    means for interacting with the controller to provide [inputs] *the specified the search criterion* to the stored program, the stored program accessing the library index according to the [provided inputs] *specified search criterion*; and
    means for identifying *from the search criteria* the initial set of *video motion picture* image sequences [associated with] *that satisfy the specified search criterion from* the accessed library index.

3. A video image bank as recited in claim 2 wherein the display means comprises:
    a video monitor;
    a video playback device *containing the library*;
    means for [retrieving from] *transferring to* the video playback device the initial set of video motion picture image sequences *identified by the accessing means*; and
    means for formatting a still frame for each video motion picture image sequence of the initial set *from the video playback device* for *simultaneous* display on the video monitor.

4. A video image bank as recited in claim 1 further comprising means for storing the [selected] *desired one of the* video *motion picture* image sequences on an output video storage device.

6. A video image bank as recited in claim [5] *1* wherein the video storage means comprises a plurality of video disks and the display means comprises a video disk changer responsive to the means for accessing to place a video disk on [the] *a* video playback device.

7. A method of automatically accessing *a desired video motion picture image sequence from among* a plurality of *unrelated* video motion picture image sequences stored in a library *using a specified search criterion*, said method comprising the steps of:
    accessing a library index [for] *having search criteria for the video motion picture image sequences in* the library [of video motion picture image sequences] *according to the specified search criterion, to automatically identify* an initial set of video *motion picture* image sequences *whose search criteria satisfy the specified search criterion*;
    displaying a still frame for each video motion picture image sequence of the initial set; and
    selecting one of the video *motion picture* image sequences from the initial set *as the desired video motion picture image sequence*.

8. A method as recited in claim 7[,] further comprising storing the [selected] *desired* video *motion picture* image sequence on an output video storage device.

9. A method of automatically accessing *a desired video motion picture image sequence from* a plurality of video motion picture image sequences stored in a library *using a specified search criterion*, said method comprising the steps of:
    generating a library index *containing search criteria for each of the stored video motion picture image sequences*;
    accessing the library index *via the selected search criterion* to automatically identify an initial set of video motion picture image sequences *that satisfy the specified search criterion from among the search criteria*;
    displaying a still frame for each video motion picture image sequence of the initial set; and
    selecting one of the video *motion picture* image sequences from the initial set *as the desired video motion picture image sequence*.

10. A method as recited in claim 9[,] further comprising storing the [selected] *desired* video *motion picture* image sequence on an output video storage device.

11. A method as recited in claim 9[,] wherein the step for generating the library index comprises storing at least one key word *as the search criteria* for each video *motion picture* image sequence and the step of accessing the library index comprises addressing the library index employing a specific key word *as the specified search criterion*.

12. A method as recited in claim 9[,] wherein the step of generating the library index comprises allocating each video motion picture image sequence to at least one menu class, *the at least one menu class forming the search criteria*, and the step of accessing the library index comprises selecting a menu class *as the specified search criterion* and identifying the video *motion picture* image sequences in the selected menu class *as the initial set*.

* * * * *